United States Patent Office 3,228,899
Patented Jan. 11, 1966

3,228,899
PHENOLIC RESINS FROM STYRENE, PHENOL AND A VEGETABLE DRYING OIL
Curtis Elmer, Wilbraham, Mass., and Jerome J. Mestdagh, Downers Grove, Ill., assignors to Monsanto Company, a corporation of Delaware
No Drawing. Filed July 10, 1961, Ser. No. 122,620
7 Claims. (Cl. 260—19)

This invention relates to phenolic resins and more particularly relates to modified phenolic resins which are useful in preparing high electrical grade, cold punching laminates.

In the past, when a laminate of the phenolic resin-impregnated type has been required to have good electrical and cold punching properties, it has been necessary to employ a cresol-based resin as the impregnant, because laminates employing other phenolic resins had inferior properties. It would, of course, be desirable to be able to substitute other phenolic resins for the cresol-based resin impregnants of these laminates without sacrificing the good electrical and cold punching properties because (1) cresol—a natural raw material—is subject to variations which lead to processing difficulties and product variations, (2) a good grade of cresol is more costly than is desirable, and (3) cresylic resins have a rather unpleasant odor.

An object of the invention is to provide novel phenolic resins.

Another object is to provide modified phenolic resins which can be used in preparing laminates having good electrical and cold punching properties.

A further object is to provide a process for preparing such phenolic resins.

These and other objects are attained by heat-reacting 100 parts by weight of a phenol with 5–70 parts by weight of styrene, 10–150 parts by weight of a drying oil, and about 15–55 parts by weight of an aldehyde, as hereinafter more completely described.

The following examples are given to illustrate the invention. Quantities mentioned in these examples, unless otherwise specified, are given on a weight basis.

EXAMPLE I

Part A

Charge 100 parts of phenol and 0.3 part of concentrated sulfuric acid to a suitable reaction vessel, heat to 70° C., and add 20 parts of styrene gradually over a period of 50 minutes. Raise the temperature of the reaction mixture to 120° C. over a period of 30 minutes, add 60 parts of tung oil, and then raise the temperature to 160° C. After maintaining the temperature at 160° C. for 3 hours, cool to 90° C., add 6 parts of hexamethylenetetramine, continue cooling to 40° C., and add 75 parts of formalin (37% formaldehyde). Now heat the reaction mixture to a reflux under vacuum at 85° C. and continue refluxing for 105 minutes. At this point the product has a dry rubber stroke cure of 15 seconds at 200° C.

Cool the batch and dehydrate under a vacuum of 27 inches of mercury until the temperature of the batch rises to 80° C. Then add 40 parts of toluene and 70 parts of ethanol. The resin solution thus formed has a solids content of 58.6% (measured by heating 3 grams of resin for 3 hours at 135° C.), a pH of 7.75, and an Ostwald viscosity of 328 cps. at 25° C.

Part B

Prepare a test laminate from the resin solution of Part A and 10 mil electrical grade cotton linters paper which has been pre-impregnated to a 16% resin content with a commercially-available, low molecular weight, liquid phenol-formaldehyde resin.

Impregnate 7 plies of the pre-impregnated paper to a total resin content of 61.5% with the resin solution of Part A, dry for 6.5 minutes at 120° C., assemble the 7 plies of treated paper, and cure the assembly for 20 minutes at 160° C. under a pressure of 1200 p.s.i. to form a test laminate about 1/16 inch thick. The test laminate has the following properties; as evaluated in accordance with ASTM test D–150–54T (electrical properties) and ASTM test D–617–44 (punching properties):

Dielectric constant _____ 4.15
Power factor _____ .027
Punching (room temperature) _____ 90

After being soaked in water for 24 hours at 23° C., the laminate has the following properties:

Dielectric constant _____ 4.21
Power factor _____ .028

EXAMPLE II

Repeat Example I except for substituting 70 parts of oiticica oil for the 60 parts of tung oil in Part A. The test laminate, like the laminate of Example I, has excellent physical and electrical properties.

EXAMPLE III

Part A

Charge 100 parts of phenol and 0.3 part of concentrated sulfuric acid to a suitable reaction vessel, heat to 80° C., and add 50 parts of styrene over a period of 33 minutes. Raise the temperature to 160° C. over a period of 30 minutes, add 70 parts of tung oil, maintain the temperature at 160° C. for 3 hours, and then cool to 105° C. Add 5 parts of hexamethylenetetramine. Stir the reaction mixture for 17 minutes to dissolve the hexamethylenetetramine, add 30 parts of toluene, cool to 32° C., and then add 30 parts of paraform (91% formaldehyde). Now heat the reaction mixture to an atmospheric reflux at 106° C. and continue refluxing for 220 minutes. Thoroughly mix 30 parts of toluene, 60 parts of ethanol, and 45 parts of methyl ethyl ketone into the batch and cool. The resin solution thus formed has a solids content of 57%, a pH of 6.85, and an Ostwald viscosity of 276 cps. at 25° C.

Part B

Using the same pre-impregnated paper as in Example I, prepare a test laminate about 1/16 inch thick by impregnating 7 piles of the pre-impregnated paper to a total resin content of 57% with the resin solution of Part A, drying for 20 minues at 120° C., assembling the 7 plies of treated paper, and curing the assembly for 30 minues at 160° C. and 1000 p.s.i. The laminate has the following properties:

Dielectric constant _____ 4.00
Power factor _____ .030
Punching (room temperature) _____ 95

After being soaked in water for 24 hours at 23° C., the laminate has the following properties:

Dielectric constant _____ 4.15
Power factor _____ .030

EXAMPLE IV

Charge 100 parts of phenol and 0.3 part of sulfuric acid to a suitable reaction veessel, heat to 68° C., and add 50 parts of styrene over a period of 53 minutes. Raise the temperature to 115° C. over a period of 30 minutes, add 40 parts of formalin (37% formaldehyde) over a period of 35 minutes, reflux at atmospheric pressure for 90 minutes, and then dehydrate at atmospheric pressure until the temperature rises to 150° C. Now add 60 parts of dehydrated castor oil and heat to 160° C. After maintaining the temperature at 160° C. for 1 hour, add 50 parts of toluol. Now cool to 60° C., add 5.5 parts of hexamethylenetetramine and 12 parts of paraform, and heat to a boil at atmospheric pressure. After boiling for 35 minutes, charge 100 parts of ethanol, thoroughly mix, and cool. The resulting varnish has a solids content of about 56% and an Ostwald viscosity of 328 cps. A laminate prepared as in Example I from this varnish and pre-impregnated paper has excellent appearance and a very light color.

EXAMPLE V

Charge 100 parts of phenol and 0.3 part of sulfuric acid to a suitable reaction vessel, add 50 parts of styrene over a period of 1 hour, heat to 108° C. for 30 minutes, and add 50 parts of formalin (37% formaldehyde) over a period of 44 minutes. After boiling at atmospheric pressure for 1.5 hours, dehydrate at atmospheric pressure until the batch temperature rises to 150° C. Then add 70 parts of tung oil and maintain the temperature at 154° C. for 30 minutes. When cool, the product is a tough, rubbery solid which is soluble in aromatic solvents and in drying oils.

The present invention relates to phenolic resins having particular utility in the preparation of high electrical grade, cold punching laminates. These resins are the heat-reaction products of 100 parts by weight of a phenol, 5–70 parts by weight of styrene, 10–150 parts by weight of a drying oil, and about 15–55 parts by weight of an aldehyde.

Since a particular object of the invention is the provision of non-cresylic phenolic resins which are at least equivalent in performance to prior art cresol-based resins which have been used in preparing high electrical grade, cold punching laminates, the phenolic constituent of the heat-reaction products of the invention is usually phenol itself. However, as will be obvious to those skilled in the art, the invention is also applicable to the modification of phenol-aldehyde condensates wherein the phenolic constituent is a homolog phenol, e.g., cresol, xylenol, etc.

The amount of styrene reacted into the present heat-reaction products is in the range of 5–70 parts by weight, based on 100 parts of phenol. When the resin is to be employed in a high electrical grade, cold punching laminate application, the amount of styrene is usually preferred to be in the range of 10–40 parts, based on 100 parts of phenol. An increase in the concentration of styrene results in a slower-curing, less tightly cross-linked resin.

The concentration of drying oil (e.g., tung oil, oiticica oil, castor oil, linseed oil, etc.) is in the range of 10–150 parts, preferably 50–80 parts, based on 100 parts of phenol. An increase in the concentration of drying oil results in a more flexible resin.

The aldehyde concentration is dependent on the properties desired for the final product (e.g., fusibility vs. infusibility) and on the concentrations of styrene and drying oil employed. Ordinarily, the products which are more highly modified with styrene and drying oil require less aldehyde. Within the scope of the invention, the aldehyde is employed in amounts of about 15–55 parts, preferably about 25–35 parts, based on 100 parts of phenol. Formaldehyde is the aldehyde which is usually employed, but other aldehydes (e.g., acetaldehyde, furfural, etc.) are also utilizable.

According to the preferred embodiment of the invention the heat-reaction products are prepared by reacting the phenol and styrene, then reacting the drying oil with the phenol-styrene reaction product, and finally reacting the aldehyde with the phenol-styrene-drying oil reaction product. Alternatively, the order of addition of the reactants can be varied by adding part or all of the aldehyde prior to the addition of the drying oil, but the products obtained by this alternative method are usually inferior in solvent-resistance.

The styrene is reacted with the phenol under acidic conditions (i.e., at a pH below 5.0, obtained, e.g., by the use of 0.1–1% by weight, based on phenol, of sulfuric acid, toluene sulfonic acid, $BF_3$, $AlCl_3$, or the like) at 25–145° C. As demonstrated in the specific examples, it is usually preferred to maintain these reaction conditions for about 30 minutes after completion of the addition of styrene to insure complete reaction, although the reaction is instantaneous with the addition of styrene.

Reaction with the drying oil is conducted at 150–180° C. over a period of 0.5–5 hours. Reaction with the aldehyde is conducted at 70–110° C. to a dry rubber endpoint of 2–60 seconds at 200° C. (The dry rubber endpoint of the reaction is determined by rapidly stroking a sample of the resin on a clean hot plate having a temperature of 200° C. with a clean spatula until the marks made by the spatula remain. The time required for the resin to reach the stage where it retains these marks is its dry rubber stroke cure, i.e., the dry rubber endpoint of the reaction.)

If a thermosetting resin is desired as the product, at least part of the aldehyde reaction is conducted under basic conditions (i.e., at a pH above 5.0, obtained, e.g., by the use of 4–8%, based on the weight of phenol, of hexamethylenetetramine, ammonia, triethylamine, etc.). If, on the other hand, a permanently fusible resin is desired, the entire reaction can be conducted under acidic conditions.

The phenolic resins of the present invention can be partially or completely dehydrated, depending on the application in which they are to be employed. Also, organic solvents can be added to the resins when varnishes are desired. According to one of the preferred embodiments of the invention, one or more organic solvents, such as toluene, ethanol, methyl ethyl ketone, etc., are added to the resin to form a varnish having an Ostwald viscosity of 300–400 cps. at 25° C.

Such varnishes can be used to impregnate fibrous sheets, such as cellulose paper, asbestos paper, cotton fabric, etc., and are especially valuable for impregnating electrical grade cellulose paper. In this application the paper—optionally pre-impregnated with a minor amount of a low molecular weight liquid phenolic resin—is impregnated to a total resin content of about 55–65%, with one of the varnishes of the invention, dried, assembled with a plurality of other plies of thus-treated paper, and heated at temperatures usually in the range of about 130–180° C. under pressures of about 1000–2500 p.s.i. to form a laminate. These laminates are characterized by good electrical and punching properties previously unattainable without the use of cresol-based resin impregnants.

The particular advantage of the invention is, of course, in its provision of resins useful in the preparation of high electrical grade, cold punching laminates. However, since the products of the invention can vary from hard, highly crosslinked resins to soft, lightly crosslinked resins and even to unreactive novolac-type resins and can also vary from comparatively brittle to highly flexible products, the resins can also be used in a variety of other applications, e.g., friction elements, coated abrasives, molding compounds, surface coatings, adhesives, etc.

In the various applications in which the resins of the present invention can be used, they can be modified by conventional additives, such as fillers, plasticizers, stabilizers, flame-retardants, etc.

It is obvious that many variations can be made in the products and processes set forth above without departing from the spirit and scope of this invention.

What is claimed is:

1. A process which comprises (1) reacting 100 parts by weight of a phenol with 5–70 parts by weight of styrene at 25–145° C. under acidic conditions, (2) reacting the product of step (1) with 10–150 parts by weight of a vegetable drying oil at 150–180° C. under acidic conditions, and (3) reacting the product of step (2) with about 15–55 parts by weight of an aldehyde at 70–100° C. under basic conditions to a dry rubber endpoint of 2–60 seconds at 200° C.

2. The product prepared by the process of claim 1.

3. The process of claim 1 wherein the aldehyde is formaldehyde.

4. The process of claim 1 wherein the styrene is 10–40 parts by weight thereof, the vegetable drying oil is 50–80 parts by weight thereof, and the aldehyde is 25–35 parts by weight thereof.

5. A varnish comprising an organic solvent solution of the product prepared by the process of claim 1 wherein the varnish has an Ostwald viscosity of 300–400 cps. at 25° C.

6. The process of claim 1 wherein the drying oil is tung oil and the aldehyde is formaldehyde.

7. The product prepared by the process of claim 6.

References Cited by the Examiner

UNITED STATES PATENTS

| | | | |
|---|---|---|---|
| 2,114,121 | 4/1938 | Bender | 260—19 |
| 2,374,316 | 4/1945 | Whiting | 260—19 |
| 2,731,428 | 1/1956 | Harrison | 260—19 |
| 2,859,205 | 11/1958 | Lection | 260—62 |

FOREIGN PATENTS

| | | |
|---|---|---|
| 516,936 | 1/1940 | Great Britain. |
| 622,936 | 5/1949 | Great Britain. |

LEON J. BERCOVITZ, *Primary Examiner.*

MILTON STERMAN, *Examiner.*